US009420803B1

(12) United States Patent
Stevens

(10) Patent No.: US 9,420,803 B1
(45) Date of Patent: Aug. 23, 2016

(54) APPARATUS FOR MECHANICALLY PROCESSING AN ORGAN OR ORGANS TAKEN OUT FROM SLAUGHTERED POULTRY

(71) Applicant: Meyn Food Processing Technology B.V.

(72) Inventor: Erik Johannes Stevens, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 15/070,360

(22) Filed: Mar. 15, 2016

(30) Foreign Application Priority Data

Mar. 24, 2015 (NL) ..................................... 2014512

(51) Int. Cl.
*A22C 21/00* (2006.01)
*A22C 21/06* (2006.01)

(52) U.S. Cl.
CPC .................................... *A22C 21/06* (2013.01)

(58) Field of Classification Search
CPC ... A22C 17/14; A22C 21/0092; A22C 21/06
USPC .......................................... 452/106, 111–114
See application file for complete search history.

(56) References Cited

U.S. PATENT DOCUMENTS 2,738,547 A * 3/1956 Zebarth .................. A22C 21/06 452/106
4,467,498 A * 8/1984 Graham ................. A22C 21/06 452/117
5,242,324 A * 9/1993 Koops ...................... A22B 5/18 452/111
5,569,067 A * 10/1996 Meyn ..................... A22C 21/06 452/106
8,303,383 B2 * 11/2012 Jansen .................. A22C 21/06 452/106
2010/0279593 A1 11/2010 Spijker
2010/0279596 A1 * 11/2010 Emura .................. B60H 1/248 454/119
2011/0244773 A1 10/2011 Jansen
2015/0140911 A1 * 5/2015 Heemskerk ........ A22C 21/0046 452/117

FOREIGN PATENT DOCUMENTS

| EP | 1769681 | 4/2007 |
|---|---|---|
| EP | 2294922 | 3/2011 |
| RU | 2004101713 | 7/2005 |

OTHER PUBLICATIONS

PCT Search Report dated May 23, 2015 for application 2014512.

* cited by examiner

*Primary Examiner* — Richard Price, Jr.
(74) *Attorney, Agent, or Firm* — Dority & Manning, P.A.

(57) ABSTRACT

Method and gizzard peeler for peeling a gizzard. A slit-open gizzard is provided on top of a horizontal and rotating turntable that is provided with rotating rollers, which rollers have an effective operating surface with respect to the gizzards to be peeled which is at least approximately flush, yet preferably slightly above a surface of the turntable, and arranging that the gizzard moves on top of the turntable from the point where it is deposited to an aperture in the turntable which functions as an exit for peeled gizzards.

12 Claims, 4 Drawing Sheets

13
27
14
26

APPARATUS FOR MECHANICALLY PROCESSING AN ORGAN OR ORGANS TAKEN OUT FROM SLAUGHTERED POULTRY

PRIORITY STATEMENT

The present application claims priority under 35 U.S.C. §119 to Dutch Application No. 2014512, filed Mar. 24, 2015.

FIELD OF THE INVENTION

The subject matter of the present disclosure relates to a gizzard peeler.

BACKGROUND OF THE INVENTION

In the art, methods are known for mechanically processing an organ or organs taken out from slaughtered poultry in a processing device or processing line, which organ or organs form part of an organ package and wherein the organ or organs are separated from the organ package. Usually the organ package taken out from the poultry also includes the intestines.

Such known methods are performed in a processing line for harvesting an organ or organs from an organ package taken out from slaughtered poultry, which processing line includes at least one processing device for processing an organ or organs from the organ package.

EP-A-1 769 681 indicates a method and device for mechanically processing a cluster of organs of a slaughtered animal, wherein the cluster is taken out of, and separated from, the body of the slaughtered animal. A clamping device is used to fix a particular organ within the cluster, which cluster is conveyed along a predetermined path. Then tissue connections in the cluster are broken on the basis of the spatial orientation of the cluster, which is derived from the spot where the concerning organ is clamped.

In general, methods and processing lines for mechanically processing an organ or organs taken out from slaughtered poultry with the aim to harvest the separate organs from the organ package are suffering from diverse problems such as that organ packages or organs thereof are lost during processing, damage occurs to organs such as the liver and the heart, and unintentionally certain organs such as gallbladders are not removed or organs are not entirely separated and cause obstructions in the processing line. A known challenge particular to gizzard peelers is to provide effective separation between the gizzards and the parts that are peeled therefrom. Further problems are connected to the use of huge amounts of water and energy. Notably also the processing lines of the prior art include many parts and are expensive whilst such lines are still suffering from the problem that the organ packages are not handled well.

In order to answer to increasing demand for automatic processing of the organ packages, it is preferable that the processing line incorporates a series of processing devices for sequentially harvesting from an organ package one or more organs from the group including a heart, a liver, and a gizzard (ventriculus) with a pre-stomach (proventriculus) attached thereto.

Although the organ package can have a diversity of organs, it is preferable that the organ package includes at least a heart and/or a liver and/or a gizzard and/or a pre-stomach and that the organ harvester supplies these organs or a selection thereof through its exit or exits. Hence at predetermined points harvesting of subsequently liver, heart, and gizzard with pre-stomach can occur.

In such an automatic processing line, normally it is preferred to include a gizzard processing device for separating a pre-stomach from a gizzard and a gizzard peeler for subsequently peeling the gizzard. Wherever in this document reference is made to a gizzard this refers to the ventriculus, and wherever reference is made to a pre-stomach this refers to the proventriculus.

SUMMARY OF THE INVENTION

The instant invention is embodied in a gizzard peeler which has an in-feed for an opened gizzard and an exit for a peeled gizzard and is provided with transportation means for moving the gizzard from the in-feed to the exit. Both the in-feed and/or the exit may be provided with a washing drum for washing the opened gizzard and the peeled gizzard respectively.

EP-A-2 294 922 teaches a gizzard peeler that includes a series of roller sets, each roller set including a first roller and a second roller that in use rotate in opposite directions. The roller sets collectively form a substantially cylindrical case or form part of such a case for the gizzard. The cooperating rollers of each roller set do not only provide effective peeling, but also ensure transportation from the gizzard from the in-feed section to the exit of the peeler.

In its continuous quest for further improving the quality and effectiveness of its poultry processing machinery in general and the subject gizzard peeler in particular, the applicant now proposes a completely different design with the features of one or more of the appended claims.

According to exemplary embodiments of the invention, a gizzard peeler is proposed having an in-feed for an opened gizzard, an exit for a peeled gizzard, and transporting means for moving the gizzard from the in-feed to the exit, which peeler includes a turntable provided with rollers for peeling the gizzards. During use the turntable is essentially horizontal, and practice has proven that this very much simplified design provides superior peeling efficiency. Preferential features of the new design of the gizzard peeler according to the invention are discussed hereafter.

The invention is also embodied in an exemplary method for peeling a gizzard. This exemplary method includes the steps of depositing a slit-open gizzard on top of a horizontal and rotating turntable that is provided with rotating rollers. The rollers have an effective operating surface with respect to the gizzards to be peeled that is at least approximately flush, yet preferably slightly above a surface of the turntable, and arranging that the gizzard moves on top of the turntable from the point where it is deposited to an aperture in the turntable that functions as an exit for peeled gizzards.

Preferably, in one exemplary aspect, the rollers are provided with their longitudinal axis in radial directions of the turntable. Particularly when the rollers span nearly the entire radius of the turntable, this exemplary aspect is found to be a favorable construction in terms of peeling efficiency.

A suitable exemplary construction is that the rollers are provided in radial slits within the turntable and—as already mentioned—with their operable surface approximately flush with or preferably slightly above an upper surface of the turntable.

Preferably the rollers are provided in the turntable as roller sets, each roller set including a first roller and a second roller that in use rotate in opposite directions. This comes as a surprise because although roller sets described in EP-A-2 294 922, the construction of the gizzard peeler of the invention is completely different and it would not be logical to expect similar benefits when these roller sets are applied in the design of the invention.

Also, in another exemplary aspect, preferably the first and second rollers of each roller set have intermeshing teeth. This ensures coordinated action of the first and second rollers of each roller set.

Beneficially an exemplary gizzard peeler of the invention is provided with a fixed gearwheel underneath the turntable that intermeshes with teeth provided on the rollers. This is a simple and robust way to drive the rollers by rotating the turntable. One and all is preferably done such that the gearwheel intermeshes with only one selected roller of each roller set, and that the non-selected roller only intermeshes with the selected roller. Due to the combined operation of the first and second roller of each roller set and the gearwheel, the rollers of the roller sets are put in concerted motion.

Preferably, for this exemplary embodiment, the intermeshing teeth of the first and second roller are selected from the group comprising helically shaped ribs and straight ribs. Both types of ribs have proven effective in peeling the gizzards in the peeling device of the invention.

Desirably further, in another exemplary embodiment, a spiraling vertical wall or strip is provided above the turntable, enabling the turntable with the rollers to move with reference to and underneath the spiraling wall or strip. The spiraling vertical wall or strip then, together with the operation of the rollers on the gizzards, ensures that the gizzards move from the in feed to the exit at a desired pace. Consequently the spiraling vertical wall or strip defines a passageway for the gizzards from the in feed to the exit.

Further it is remarked that the turntable is preferably provided, in an exemplary aspect, with a central aperture that embodies the exit for the gizzards.

The invention will hereinafter be further elucidated with reference to a processing line in which several processing devices in accordance with exemplary aspects of the invention are employed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Wherever in the figures the same reference numerals are applied, these numerals refer to the same or similar features or parts of the devices shown.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
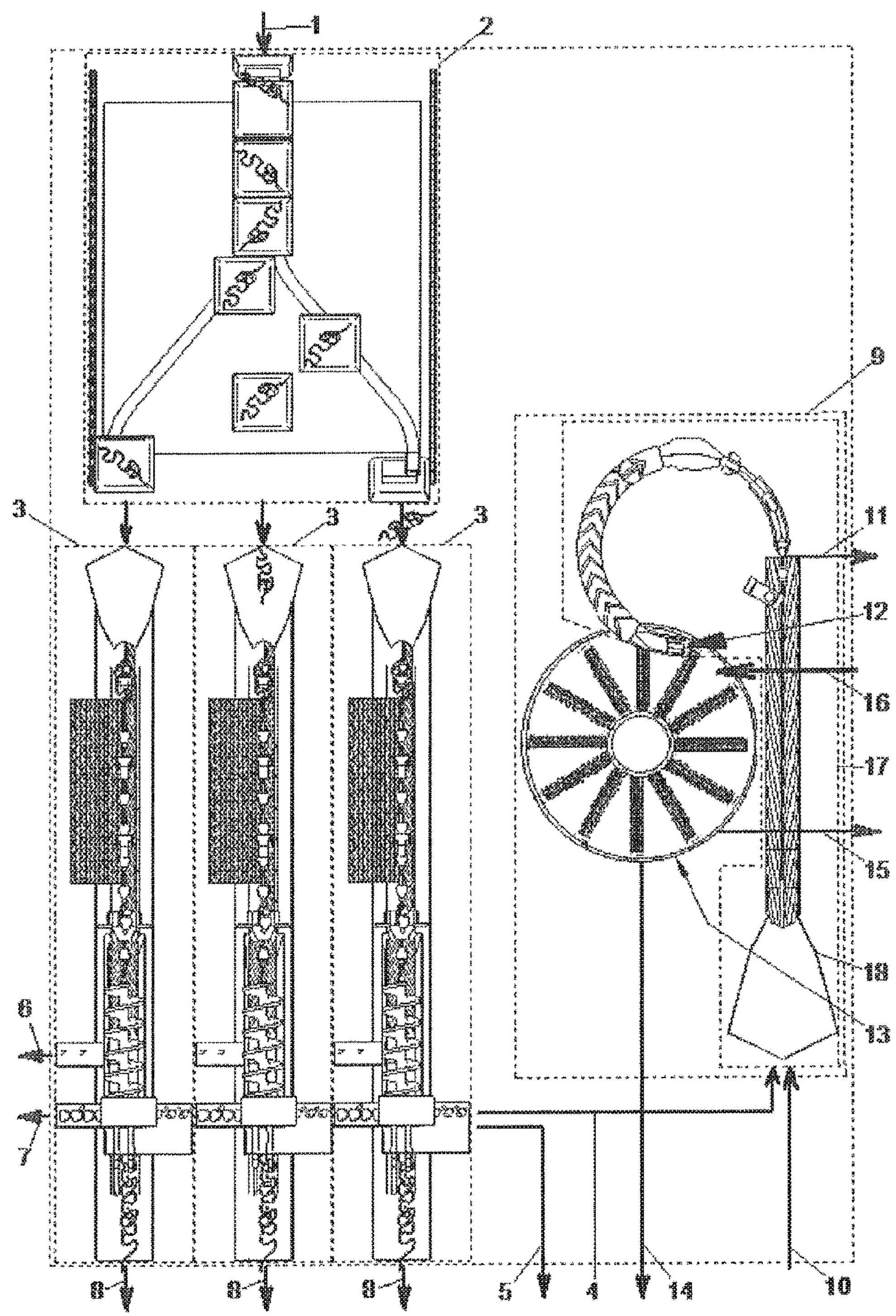
FIG. 1 provides a top view of a processing line.

The following terms are defined as follows for this disclosure:

With reference first to FIG. 1, a top view is shown of a processing line for harvesting an organ or organs from an organ package taken out from slaughtered poultry wherein subsequently different processing devices are employed which can also be employed independently and separate from the other processing devices that are placed in the processing line.

Organ packages are supplied by means of an endless conveyor 1 which may have any conventional form such as an endless conveyor with pans in which the organ packages are transported, but may also be embodied in the form of transport shackles which can be commanded to release the organ packages at the entrance of at least one processing line or at the location of a divider unit 2, if multiple processing sub-lines are employed. The divider unit 2 divides the stream of organ packages into as many parallel streams as desired. The figure shows that the division occurs into three parallel lines, each line including at least one organ harvester 3 for harvesting hearts at exit 6, livers at exit 7 and gizzards with pre-stomach at exit 4. Exit 4 connects to a gizzard processing device as will be discussed hereinafter. Further, exit 8 is provided for disposal of inedible portions of the organ packages that are processed in the organ harvester 3 of the concerning line. An exit 5 for gizzards with pre-stomach is provided in case it is not intended to further process these gizzards.

If the gizzards with pre-stomach are intended to be further processed they can be entered at an in-feed 18 of a gizzard processing device 17 which is followed by a gizzard peeler 13 according to exemplary aspects of the invention that provides peeled gizzards at its exit 14. Any waste leaves the gizzard processing device 17 at exit 11 and leaves the gizzard peeler 13 at its exit 15.

The gizzard peeler 13 also includes a separate entry 16 for manually inputting any gizzards, which require a further peeling operation. The gizzard processing device 17 together with the gizzard peeler 13 of the invention are indicated with reference numeral 9.

Figure 2:
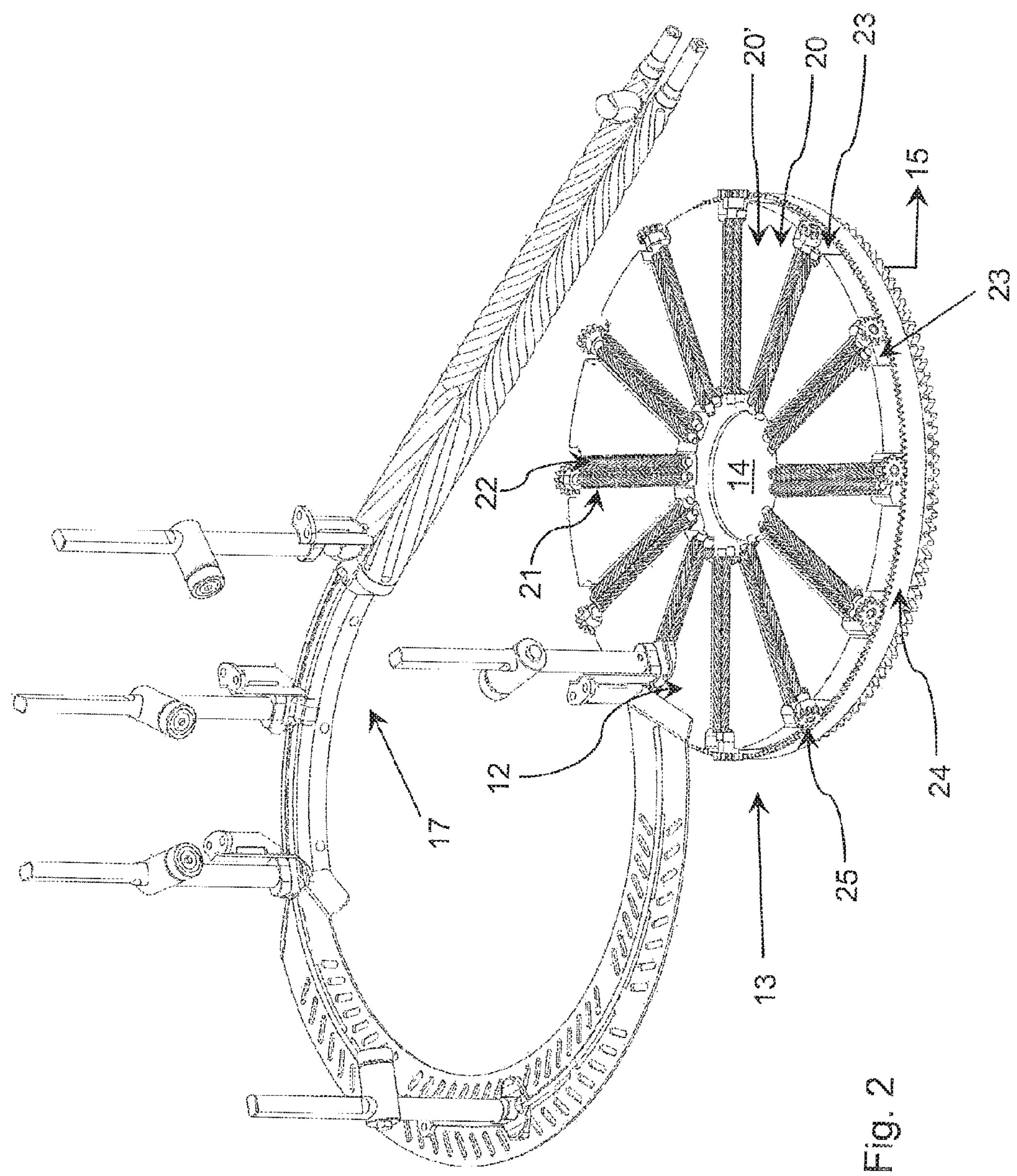
FIG. 2 schematically shows an exemplary embodiment of a gizzard peeler in accordance with the invention.

Turning now to FIG. 2 showing schematically the exit part of gizzard processing device 17 ending into the in feed 12 of the gizzard peeler 13, the figure clearly shows that the gizzard peeler 13 of the invention includes a turntable 20 provided with rollers 21, 22 for peeling the gizzards, and that the rollers 21, 22 are provided with their longitudinal axis in radial directions of the turntable 20. This feature can likewise be seen in FIG. 3.

Figure 3:
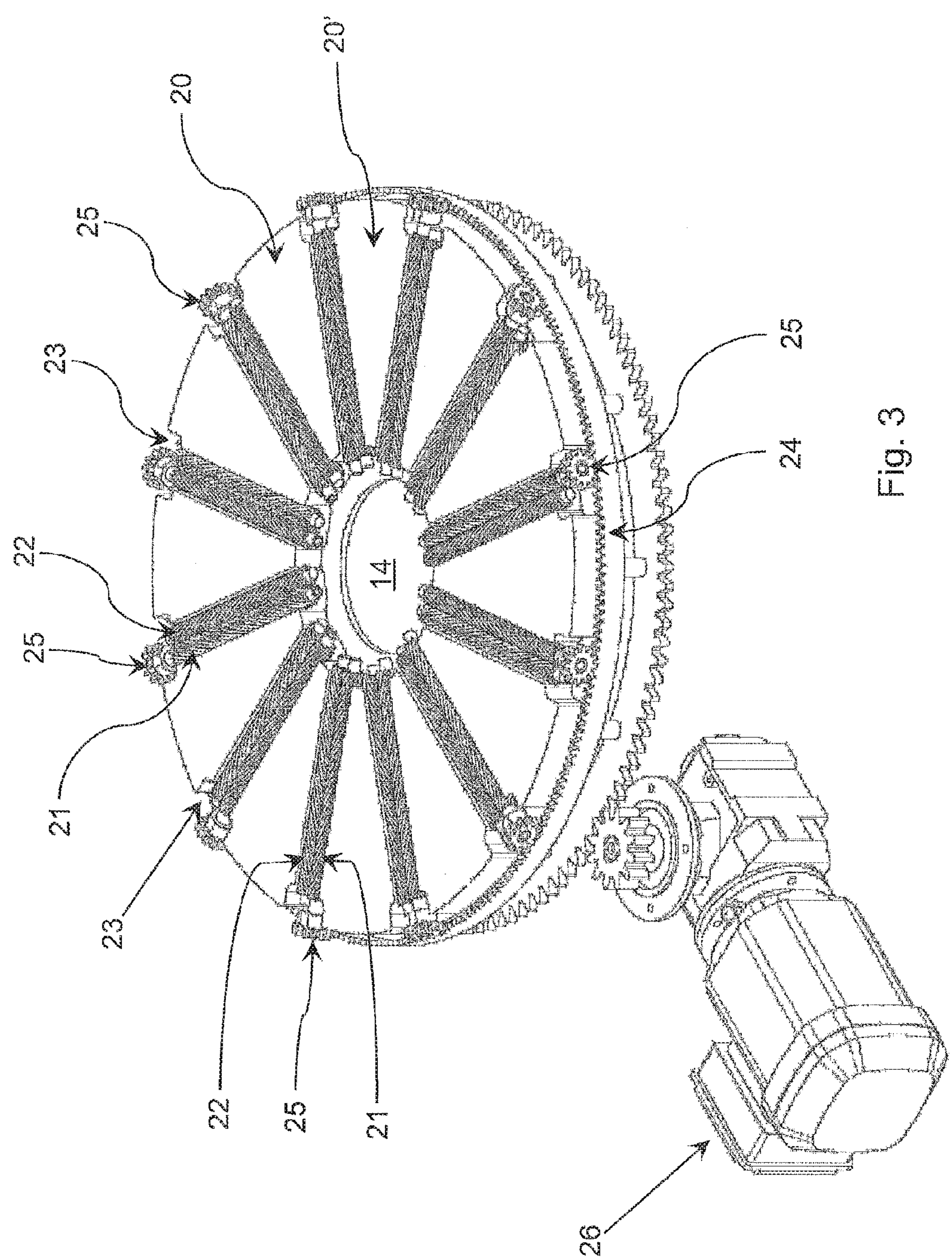
FIG. 3 shows the turntable forming part of the exemplary gizzard peeler of FIG. 2.

FIGS. 2 and 3 further show that the rollers 21, 22 are provided in radial slits 23 within the turntable 20 and that the rollers 21, 22 have their operable surface approximately flush with or preferably slightly above an upper surface 20' of the turntable 20.

As can be best seen in FIG. 3, the rollers 21, 22 are provided in the turntable 20 as roller sets, each roller set including a first roller 21 and a second roller 22 that in use rotate in opposite directions. FIG. 3 also shows that the first and second rollers 21, 22 of each roller set have intermeshing teeth or ribs. These teeth or ribs of the first and second rollers 21, 22 are very effective in peeling the gizzards, and the tissue that is removed from the gizzards by the operation of the rollers 21, 22 is disposed through the slits 23 in which the rollers 21, 22 are accommodated. Eventually the remove tissue is discarded via the earlier mentioned exit 15 of the peeling device 13.

FIG. 2 and FIG. 3 show that a fixed gearwheel 24 is provided underneath the turntable 20 that intermeshes with teeth 25 provided on the rollers 21. It further shows that the gearwheel 24 intermeshes with only one selected roller 21 of each roller set, and that the non-selected roller 22 only intermeshes with the selected roller 21. It is remarked that the intermeshing teeth of the first and second roller 21, 22 are selected from the group comprising helically shaped ribs and straight ribs. The figures only show helically shaped ribs, but the artisan can imagine how straight ribs look so there is no need to show this embodiment with straight ribs in a separate figure.

Figure 4:
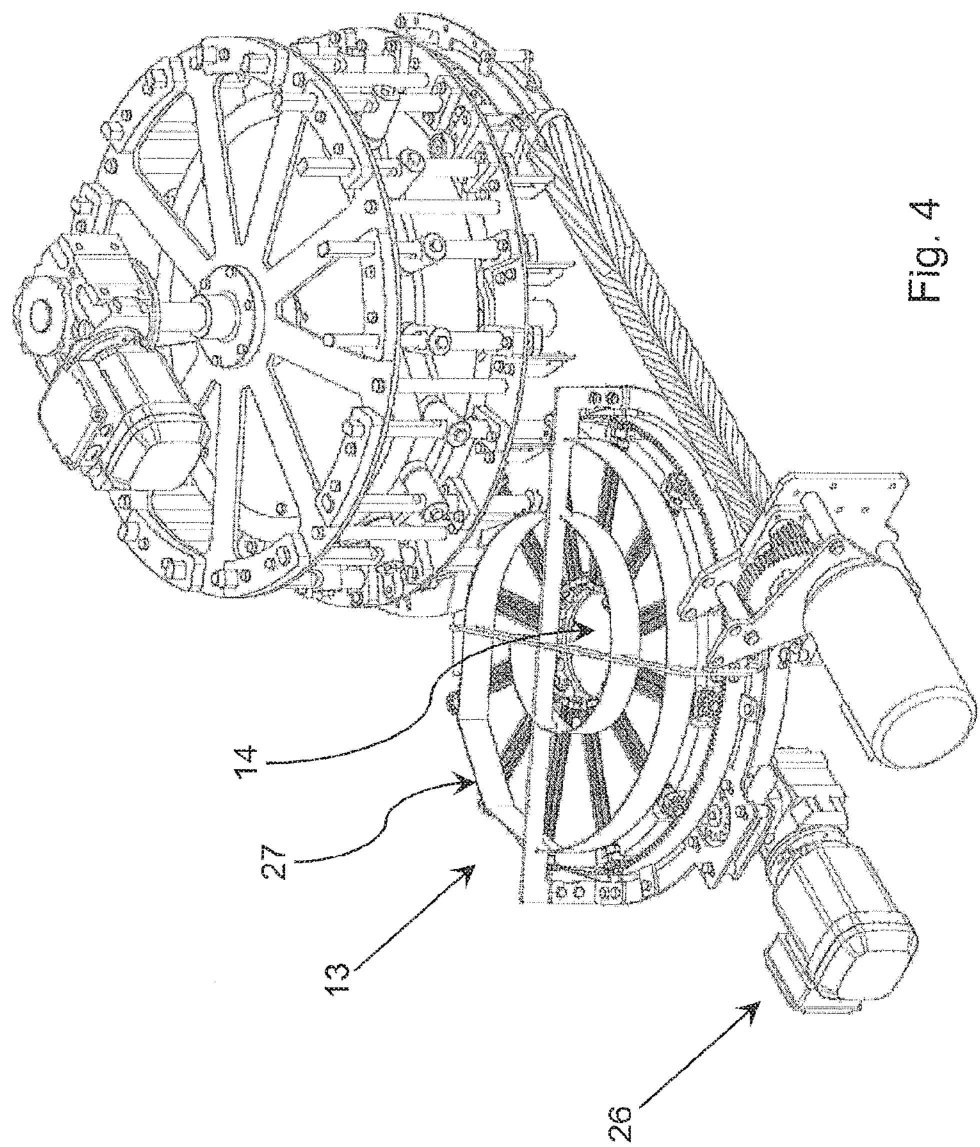
FIG. 4 shows a more complete picture of the exemplary gizzard peeler of the invention.

Turning now to the more complete picture of the gizzard peeler 13 of the invention as provided in FIG. 4, a motor 26 is depicted that is used to drive the turntable 20. Further in this FIG. 4 it is shown that a spiraling vertical wall or strip 27 is provided above the turntable 20, enabling the turntable 20 with the rollers 21, 22 to rotationally move with reference to and underneath passed the spiraling wall or strip 27. The spiraling vertical wall or strip 27 therewith defines a passageway for the gizzards from the in feed 12 to the exit 14 which is embodied by a central aperture in the middle of the turntable 20.

Although the invention has been discussed in the foregoing with reference to an exemplary embodiment of the gizzard peeler of the invention, the invention is not restricted to this particular embodiment which can be varied in many ways without departing from the gist of the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment. It is for instance possible that the gizzard peeler is provided with a washing unit at its in-feed and/or its exit.

What is claimed is:

1. A gizzard peeler, comprising:

an in-feed for an opened gizzard;

an exit for a peeled gizzard; and transporting means for moving the gizzard from the in-feed to the exit, the transporting means comprising a turntable provided with rollers for peeling the gizzards wherein the rollers are provided in radial slits within the turntable and with their operable surface approximately flush with or slightly above an upper surface of the turntable.

2. The gizzard peeler according to claim 1, wherein the rollers are provided in radial slits within the turntable and with their operable surface approximately flush with or slightly above an upper surface of the turntable.

3. The gizzard peeler according to claim 1, wherein the rollers are provided in the turntable as roller sets, each roller set comprising a first roller and a second roller that in use rotate in opposite directions.

4. The gizzard peeler according to claim 3, wherein the first and second rollers of each roller set have intermeshing teeth.

5. The gizzard peeler according to claim 3, further comprising a fixed gearwheel underneath the turntable that intermeshes with teeth provided on the rollers.

6. The gizzard peeler according to claim 5, wherein the gearwheel intermeshes with only one selected roller of each roller set, and the non-selected roller only intermeshes with the selected roller.

7. The gizzard peeler according to claim 3, wherein the intermeshing teeth of the first and second roller are selected from the group including helically shaped ribs and straight ribs.

8. The gizzard peeler according to claim 3, further comprising a spiralling vertical wall or strip provided above the turntable, enabling the turntable with the rollers to move with reference to and underneath the spiralling wall or strip.

9. The gizzard peeler according to claim 8, wherein the spiralling vertical wall or strip defines a passageway for the gizzards from the infeed to the exit.

10. The gizzard peeler according to claim 1, wherein the turntable is provided with a central aperture which embodies the exit for the gizzards.

11. The gizzard peeler according to claim 1, wherein the in-feed, the exit, or both, are provided with a washing drum for washing the opened gizzard and the peeled gizzard respectively.

12. A method for peeling a gizzard, comprising:

depositing a slit-open gizzard on top of a horizontal and rotating turntable that is provided with rotating rollers, the rollers having an effective operating surface with respect to the gizzards to be peeled that is at least approximately flush, or above, a surface of the turntable; and arranging that the gizzard moves on top of the turntable from the point where it is deposited to an aperture in the turntable which functions as an exit for peeled gizzards.

* * * * *